United States Patent Office 3,565,496
Patented Feb. 23, 1971

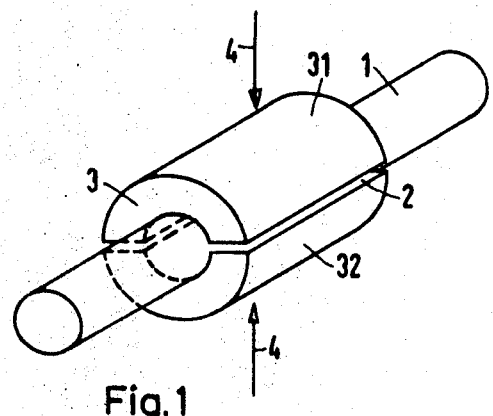
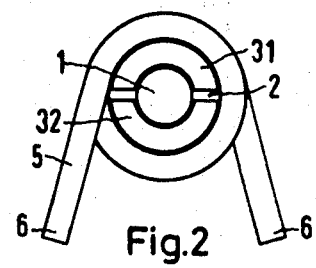
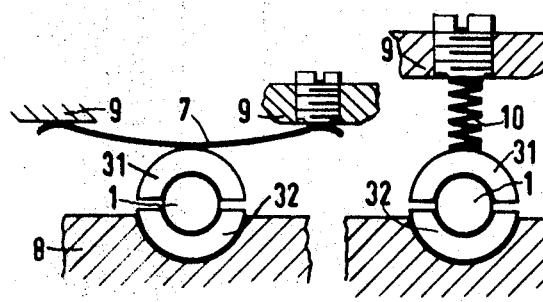
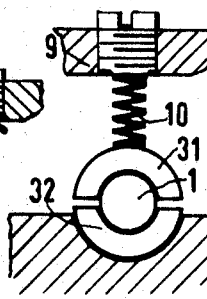
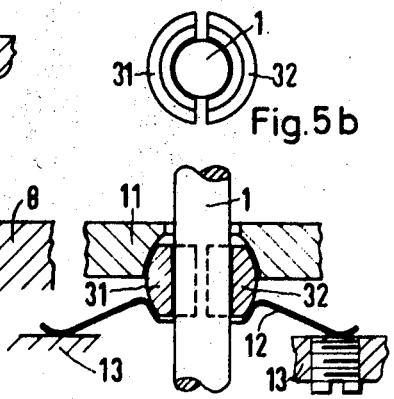
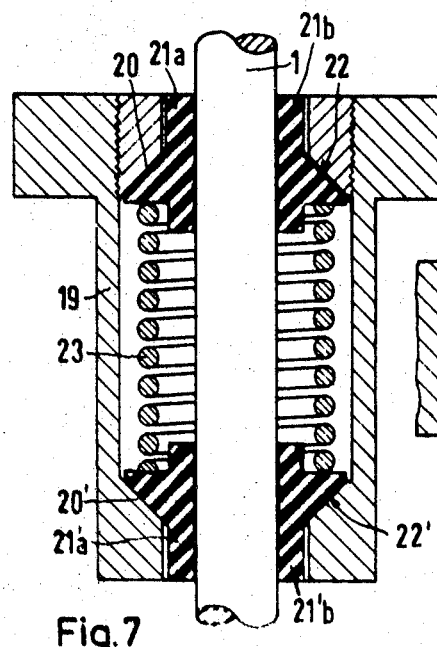
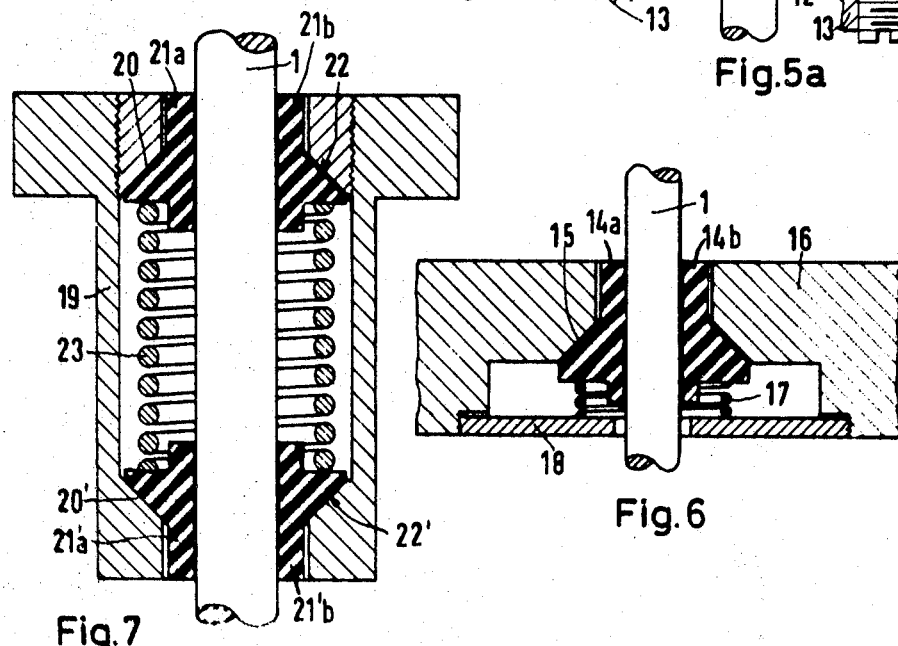

3,565,496
LOW NOISE BEARING OF SYNTHETIC MATERIAL
Hans-Peter Latussek and Heinz Petrak, Nuremberg, and Martin Müller, Erlangen, Germany, assignors to Siemens Aktiengesellschaft, Berlin and Munich, Germany, a corporation of Germany
Filed Apr. 1, 1969, Ser. No. 811,736
Claims priority, application Germany, Apr. 4, 1968, P 17 50 167.6
Int. Cl. F16c 27/00
U.S. Cl. 308—26  5 Claims

ABSTRACT OF THE DISCLOSURE

A low noise bearing of synthetic material for precision mechanical apparatus and miniature motors comprises a bearing body having an elongated continuous slot formed therethrough to divide the bearing body into bearing body portions. The bearing body portions enclose a rotary shaft and are urged against the shaft at a determined force by a spring.

---

The present invention relates to a low noise bearing of synthetic material. More particularly, the invention relates to a low noise bearing of synthetic material for precision mechanical apparatus and miniature motors.

Bearings, and especially oil-free synthetic bearings for precision mechanical apparatus and motors, have a tendency to produce considerable noise when the rotary shaft enclosed by such bearings rotates at great speed. The noise is produced as a result of the slip stick effect. The slip stick effect is particularly pronounced in polarized split pole motors, especially when the radial bearing load of the rotary shaft decreases below a specific magnitude.

It has been suggested that a device which can exert specific bearing pressure be utilized in order to eliminate bearing noises. Such a device comprises, in addition to the actual bearing body, another body which is loosely arranged and which exerts a radial bearing pressure under the action of a pressure spring.

The principal object of the present invention is to provide a new and improved low noise bearing.

An object of the present invention is to provide a low noise bearing of synthetic material.

An object of the present invention is to provide a low noise bearing of synthetic material for oil-free precision mechanical apparatus and miniature motors.

An object of the present invention is to provide a low noise bearing which removes bearing air between the shaft and the bearing body in order to provide low noise operation.

An object of the present invention is to provide a low noise bearing which eliminates the slip stick effect.

An object of the present invention is to provide a low noise bearing which dampens rotary and radial oscillations which may occur in the rotary shaft, especially in polarized miniature motors.

Another object of the present invention is to provide a low noise bearing which functions with efficiency, effectiveness and reliability.

In accordance with the present invention, a low noise bearing of synthetic material for precision mechanical apparatus and miniature motors comprises a bearing body enclosing a rotary shaft. The bearing body has an elongated continuous slot formed therethrough to divide the bearing body into bearing body portions. Pressure means rejects the bearing body portions against the rotary shaft at a determined force.

The bearing body has an axis and the slot is formed completely through the bearing body. Its axis thereby divides the bearing body into two symmetrical bearing body portions. The pressure means comprises spring means abutting at least one of the bearing body portions. The spring means is adjustable to vary the force exerted thereby.

In one embodiment of the present invention, the pressure means comprises a substantially flat spiral spring abutting the bearing body portions and exerting the force in radial directions. In another embodiment, the pressure means comprises a spiral spring enclosing and abutting the bearing body portions and having fixedly positioned ends.

A bearing body receptacle houses the bearing body. The pressure means then comprises spring means abutting the bearing body portions in a manner whereby the force is exerted on the shaft in radial directions. The force exerted by the spring means urges the bearing body portions into the bearing body receptacle in a manner whereby the bearing body receptacle urges the bearing body portions against the shaft in radial directions. The bearing body receptacle has a recess formed therein of specific configuration. The bearing body portions form a collar of the same configuration as the recess. The spring means comprises, in one embodiment, flat spring means abutting the bearing body portions and urging the bearing body portions into the recess.

In another embodiment, the bearing body receptacle has a frustoconical recess formed therein. The bearing body portions form a collar of the same frustoconical configuration as the recess. The spring means abuts the bearing body portions and urges them into the recess. The spring means is a spiral spring positioned on the shaft.

In still another embodiment, the bearing body receptacle has a pair of spaced frustoconical recesses formed therethrough to accommodate the shaft. The bearing body portions form two spaced collars each of the same frustoconical configuration as a corresponding one of the recesses. The spring means abuts the bearing body portions of each of the two collars and urges them into the corresponding recesses. The spring means is a spiral positioned on the shaft between the two collars.

In order that the present invention may be carried into effect, it will now be described with reference to the accompanying drawings, wherein:

FIG. 1 is a perspective schematic diagram of the low noise bearing of the present invention in which the pressure means are not illustrated, but are shown by arrows;

FIG. 2 is a schematic diagram of an embodiment of the low noise bearing of the present invention;

FIG. 3 is a schematic diagram, partly in section, of another embodiment of the low noise bearing of the present invention;

FIG. 4 is a schematic diagram, partly in section, of another embodiment of the low noise bearing of the present invention;

FIG. 5a is a schematic diagram, partly in section, of another embodiment of the low noise bearing of the present invention;

FIG. 5b is a top view of part of the embodiment of FIG. 5a;

FIG. 6 is a schematic diagram, partly in section, of another embodiment of the low noise bearing of the present invention; and FIG. 7 is a schematic diagram, partly in section, of still another embodiment of the low noise bearing of the present invention.

In the figures, the same components are identified by the same reference numerals.

FIG. 1 illustrates the principle of the low noise bearing of the present invention. The principle of the bearing of the present invention is that the bearing body 3 has an elongated continuous slot 2 formed therethrough which divides said bearing body into two bearing body portions 31 and 32, contrary to the single bearing body of the prior art. The bearing body portions 31 and 32 support the rotary shaft 1 between them. Pressure is applied, in the directions of the arrows 4, to the bearing body portions 31 and 32.

The applied pressure urges the bearing body portions 31 and 32 against the rotary shaft 1 at a determined force. The pressure of the bearing body portions 31 and 32 on the shaft 1 removes the bearing air. A single elongated continuous slot may be formed through one wall of the bearing body 3, rather than both walls, as illustrated in FIG. 1. The two bearing body portions 31 and 32 permit the utilization of a nonelastic material for the bearing body. The bearing body 3 may comprise synthetic material or sintered metal. The bearing body 3 preferably comprises an oil-free synthetic material. The pressure applied in the directions of the arrows 4 is thus applied in radial directions.

Although a single elongated continuous slot may be formed through a single wall of the bearing body 3 to provide the required flexibility for the operation of the bearing of the present invention, the slot may be formed completely through said bearing body and its axis, as shown in FIG. 1. This divides the bearing body 3 into two symmetrical bearing body portions 31 and 32, as shown in FIG. 1.

The pressure, applied in radial directions, may be provided by various means. In the embodiment of FIG. 2, the pressure is applied by a substantially flat spiral spring 5. The spring 5 is wound around and abuts the bearing body portions 31 and 32 and exerts a force on said bearing body portions in radial directions toward the axis of the rotary shaft 1. The ends 6 of the spring 5 are fixed in position.

When the ends 6 of the spring 5 of the embodiment of FIG. 2 are moved towards each other, the radial pressure applied to the bearing body portions 31 and 32 is increased. When the ends 6 of the spring 5 are moved away from each other, the radial pressure applied to the bearing body portions 31 and 32 is decreased.

In the embodiment of FIG. 3, the bearing body portion 32 is housed in a bearing body receptacle 8. More particularly, the bearing body portion 32 is housed in a semicylindrically shaped recess formed in the bearing body receptacle 8. The bearing body receptacle 8 may comprise a wall or member of apparatus or a bearing plate of a miniature motor. The radially directed pressure is applied, in the embodiment of FIG. 3, by a flat or leaf spring 7. The ends of the leaf spring 7 abut suitably supporting members 9 and the center of said leaf spring abuts the bearing body portion 31.

The embodiment of FIG. 4 of the bearing of the present invention is the same as that of FIG. 3, with the exception that the radially directed pressure is applied by a spiral spring 10. The spiral spring 10 is positioned between a supporting member 9 and the bearing body portion 31, with one end of said spring abutting said supporting member and the other end of said spring abutting said bearing body portion.

In the embodiment of FIGS. 5a and 5b, a bearing body receptacle 11 has a recess formed therein of specific geometric configuration. The bearing body portions 31 and 32 form a collar of the same configuration as the recess of the bearing body receptacle 11. Pressure is applied by a flat spring 12 which abuts the bearing body portions 31 and 32 at its central areas and abuts suitably supporting members 13 at its end areas.

The flat spring 12 urges the bearing body portions 31 and 32 into the recess formed in the bearing body receptacle 11. This is due to the collar configuration of the bearing body portions 31 and 32 and the pressure of the flat spring 12. The pressure exerted by the spring 12 urges the bearing body portions in an axial direction into the recess formed in the bearing body receptacle 11. The axial movement of the bearing body portions 31 and 32 into the recess of the receptacle 11 causes said receptacle to apply radial forces to said bearing body portions.

In the embodiment of FIG. 6, a bearing body receptacle 16 has a frustoconical recess formed therein. The bearing body portions 14a and 14b form a collar of the same frustoconical configuration as the recess. A spiral spring 7 abuts the bearing body portions 14a and 14b and urges them into the recess formed in the bearing body receptacle 16.

In the embodiment of FIG. 6, the bearing body portions 14a and 14b comprise synthetic material and each is formed in at least part of its surface as a frustoconical section 15. The bearing body portions 14a and 14b are formed in the same manner as are the bearing body portions 31 and 32 of FIGS. 1 to 5b. One end of the spiral spring 17 abuts the bearing body portions 14a and 14b and the other end of said spiral spring abuts suitable supporting plates 18.

The spiral or helical spring 17 urges the bearing body portions 14a and 14b in an axial direction along the rotary shaft 1 into the recess formed in the bearing body receptacle 16. Due to the flexibility and elasticity of the bearing body portions 14a and 14b the axial movement thereof into the recess causes a counter force to be applied by the receptacle 16 on said bearing body portions in radial directions.

In the embodiment of FIG. 6, as in any of the other embodiments of the present invention, the elongated continuous slot formed through the bearing body may extend only through one wall thereof rather than through both walls thereof. The provision of a single slot is sufficient to impart the necessary elasticity or flexibility to the bearing body to permit said bearing body to be urged against the rotary shaft 1. The helical spring 17 in the embodiment of FIG. 6 may be replaced by any other suitable spring such as, for example, a flat spring or a plurality of spring washers, or the like.

In the embodiment of FIG. 7, a bearing body receptacle 9 has a pair of spaced frustoconical recesses formed therethrough to accommodate the shaft 1. The bearing body portions 21a and 21b form a first collar and the bearing body portions 21'a and 21'b form a second collar spaced from said first collar. Each of the collars 21a, 21b and 21'a, 21'b is of the same frustoconical configuration as a corresponding one of the recesses. A helical or spiral spring 23 is positioned on the shaft 1 between the two collars 21a, 21b and 21'a, 21'b. One end of the spring 23 abuts the bearing body portions 21a and 21b of the first collar and urges them into the corresponding recess formed in the bearing body receptacle 19. The other end of the spring 23 abuts the bearing body portions 21'a and 21'b of the second collar and urges them into the corresponding recess formed in the bearing body receptacle 19.

The rotary shaft 21 may comprise, for example, a motor shaft. The construction and operation of the embodiment of FIG. 7 is the same as that of FIG. 6, with the exception that in FIG. 7 there are two collars and two corresponding recesses formed in the receptacle. The spring 23 urges the first and second collars 21a, 21b and 21'a, 21'b away from each other in axial directions of the shaft 1. The contact of the frustoconical surface 20 of the first collar with the frustoconical surface 22 of the first recess causes counter forces to be exerted in radial directions by the receptacle 19 and the contact of the frustoconical surface 20' of the second collar with the frustoconical surface 22' of the second recess causes counter forces to be exerted in radial directions by the receptacle 19.

The bearing body portions 21a, 21b, 21'a and 21'b preferably comprise wear-resistant synthetic material which operates oil-free. The springs utilized in the various embodiments of the present invention are preferably adjustable in order to permit variation of the force exerted thereby.

While the invention has been described by means of specific examples and in specific embodiments, we do not wish to be limited thereto, for obvious modifications will occur to those skilled in the art without departing from the spirit and scope of the invention.

What is claimed is:

1. A low noise bearing of synthetic material for precision mechanical apparatus and miniature motors, said bearing comprising:
    a bearing body for enclosing a rotary shaft, said bearing body having an elongated continuous slot formed therethrough to divide said bearing body into bearing body portions; and
    pressure means urging said bearing body portions against the rotary shaft at a determined force, said pressure means comprising a substantially flat spiral spring abutting said bearing body portions and exerting said force in radial directions.

2. A low noise bearing as claimed in claim 1, wherein said pressure means comprises a spiral spring enclosing and abutting said bearing body portions and having fixedly positioned ends.

3. A low noise bearing as claimed in claim 1 wherein said pressure means comprises spring means abutting at least one of said bearing body portions and said spring means is adjustable to vary the force exerted thereby.

4. A low noise bearing of synthetic material for precision mechanical apparatus and miniature motors, said bearing comprising:
    a bearing body for enclosing a rotary shaft, said bearing body having an elongated continuous slot formed therethrough to divide said bearing body into bearing body portions;
    pressure means urging said bearing body portions against the rotary shaft at a determined force said pressure means comprising spring means abutting said bearing body portions in a manner whereby said force is exerted on the shaft in radial directions; and
    a bearing body receptacle for housing said bearing body, having a pair of spaced frustoconical recesses formed therethrough to accommodate said shaft, said bearing body portions forming two spaced collars each of the same frustoconical configuration as a corresponding one of the recesses, and said spring means abutting the bearing body portions of each of said two collars and urging them into the corresponding recesses.

5. A low noise bearing as claimed in claim 4, wherein said spring means is a spiral spring positioned on the shaft between the two collars.

References Cited
UNITED STATES PATENTS

| | | | |
|---|---|---|---|
| 1,608,633 | 11/1926 | Sundh | 308—26 |
| 2,823,055 | 2/1958 | Booth | 308—26 |
| 2,851,314 | 9/1958 | Thomson | 308—26 |
| 2,853,325 | 9/1958 | Ward | 308—26 |
| 2,717,792 | 9/1955 | Pelley | 308—26 |

FRED C. MATTERN, JR., Primary Examiner

W. S. RATLIFF, JR., Assistant Examiner